United States Patent Office 3,822,261
Patented July 2, 1974

3,822,261
5,6-DIHALO-2-FLUOROALKYL-1H-IMIDAZO(4,5-b) PYRAZINES
Yulan C. Tong, Walnut Creek, Calif., assignor to The Dow Chemical Company, Midland, Mich.
No Drawing. Filed Oct. 30, 1972, Ser. No. 301,966
Int. Cl. C07d 51/76
U.S. Cl. 260—250 R                            4 Claims

ABSTRACT OF THE DISCLOSURE

Compounds of the formula

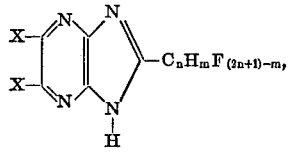

wherein X is Cl, Br or F (the same in each occurrence), $n$ is 1 to 3 and $m$ is 0 or 1, have been found especially useful as herbicides.

BACKGROUND OF THE INVENTION 5,6-dihalo-2-R-benzimidazoles are taught in the art as herbicides, insecticides and fungicides. For instance, where halo is chlorine and R is $CF_3$ or $CF_2CF_3$, see British Pat. No. 1,087,561; where halo is Br and R is $CF_3$, see British Pat. No. 1,147,183; and where R is $CCl_3$, see British Pat. No. 1,138,823.

Also known to the art are various imidazopyridines. For instance, 5,6-dihalo-2-R-1H-imidazo(4,5-b)pyridines, wherein R is H or an alkyl group, are taught as cotton defoliants in U.S. Pat. 3,401,030. 5,6-dihalo-2-Trifluoromethyl-1H-imidazo(4,5-b)pyridines are taught to have biological activity in U.S. Pat. 3,561,948.

Substituted imidazopyrazines are also known. For instance, 5,6-dimethyl-2-R-1H-imidazo(4,5-b)pyrazine, wherein R is H or alkyl, was prepared by Schipper and Day (J. Am. Chem. Soc., 74, 350 (1952)). Day and Muehlman later prepared the 5,6-unsubstituted analog. Both classes were hoped to have some physiological activity. Also reported is 5,6-diphenyl-1H-imidazo(4,5-b)pyrazine (see Chem. Abs., 51, 10533h (1957)).

The structurally closest compound to the instant invention was prepared by Palamidessi and Luini: 5,6-dichloro-2-methyl-1H-imidazo(4,5-b)pyrazine. (See Farmaco, Ed. Sci., 21 (11), 811 (1966)). No activity was reported for the compound.

SUMMARY OF THE INVENTION

It has now been found that a particular group of imidazopyrazines have surprising biological activity, especially as herbicides. The invention, then, comprises imidazopyrazines of the general formula

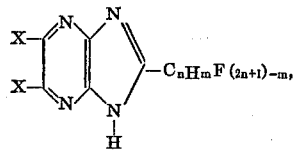

wherein X is Cl, Br or F (the same in each occurence), $n$ is 1 to 3 and $m$ is 0 to 1.

The compounds of the present invention are solids at room temperature, generally being pink, yellow or white crystals or powders. They generally melt between about 150° to 190° C., and are insoluble in water and slightly to moderately soluble in the common organic solvents.

They are generally prepared by reacting the properly 5,6-substituted-2,3-diaminopyrazine, in a solvent, with the suitable fluorinated carboxylic acid or anhydride, or with a fluorinated acyl halide. Suitable fluorine compounds include trifluoroacetic anhydride, di- and tri-fluoroacetic acid, pentafluoropropionyl chloride and heptafluorobutyryl chloride.

The subject compounds have been found suitable as herbicides, particularly pre-emergent herbicides. Their other biological utilities include their use as insecticides, fungicides and/or coccidistats.

DETAILED DESCRIPTION OF THE INVENTION

More specifically, 5,6-dihalo-2-fluoroalkyl-1H-imidazo (4,5-b)pyrazines may generally be prepared by reacting a 2,3-diamino-5,6-dihalopyrazine with a fluorinated carboxylic acid, anhydride or acid chloride in an aromatic hydrocarbon (benzene, toluene, xylene, etc.). After the reaction has come to completion (2–24 hours), the reaction mixture is suitably evaporated to dryness under reduced pressure. If, upon examination by analysis, amide functions persist in the product, it may be mixed with diphenyl ether (10 ml. per g.) and the mixture refluxed (260° C.) for about 1 to 2 hours, cooled, diluted with hexane and filtered. A relatively pure product may then be recovered.

The examples below illustrate the preparation of a representative group of the compounds of this invention:

Example 1. 5,6-Dichloro-2-trifluoromethyl-1H-imidazo (4,5-b)pyrazine (a) Nine grams (0.05 mole) of 2,3-diamino-5,6-dichloropyrazine, prepared according to the above-mentioned method of Palamidessi and Luini, and 8 ml. of trifluoroacetic anhydride were mixed in 100 ml. of xylene and heated to boiling under reflux for one hour. To the cooled reaction mixture was then added another 8 ml. of anhydride, and heating continued for another 8 hours. The reaction mix was then evaporated to dryness under reduced pressure, and the residue washed with hexane, filtered and dried. The resulting solid was then mixed with diphenyloxide (10 ml. per g.) and heated to boiling under reflux for one hour, cooled and diluted with hexane. The precipitate was collected and recrystallized from dichloromethane to give 9.5 g. of the titled product, m.p. 168–170° C.

Upon analysis, the product was found to have carbon, hydrogen and nitrogen contents of 28.3, 0.7 and 21.3 weight percents, respectively, as compared with theoretical values of 28.0, 0.4 and 21.8 weight percent calculated for the titled compound.

(b) Alternatively, it has been found that trifluoroacetic acid may also be used in the above reaction, although generally longer (i.e., about 20 hours) reaction times are necessary.

Example 2. 5,6-Dichloro-2-(pentafluoroethyl)-1H-imidazo(4,5-b)pyrazine 4.4 Grams (0.025 mole) of 2,3-diamino-5,6-dichloropyrazine and 50 ml. of xylene were placed in a flask equipped with a Dry Ice-filled condenser, thermometer, magnetic stirrer and gas-inlet tube. 4.5 Grams (0.025 mole) of pentafluoropropionyl chloride was bubbled into the flask, with stirring, while the contents were maintained at about 10–15° C. The reaction mixture was then stirred, at room temperature, for about 4 hours, followed by heating under reflux for about 2 hours. The reaction mix was then evaporated to dryness and residue mixed with 50 ml. of diphenyloxide and heated to 260° C. for 1.5 hours, cooled and precipitated from hexane. 2.6 Grams of the titled product resulted, M.P. 178–9° C.

Upon analysis, the product was found to have carbon, hydrogen and nitrogen contents of 27.7, 0.5 and 17.9 weight percent, respectively, as compared with theoretical values of 27.4, 0.3 and 18.3 weight percent.

Example 3. 5,6-Dichloro-2-(n-heptafluoropropyl)-1H-imidazo(4,5-b)pyrazine

The titled compound was prepared, as in Example 2 above, from the amino-pyrazine and heptafluorobutyryl chloride. 3.3 grams of the titled compound with a melting point of 158–60° C. were isolated.

Analysis for carbon, hydrogen and nitrogen content was 27.0, 0.6 and 15.6 weight percent, respectively, as compared with theoretical values of 26.9, 0.3 and 15.7 weight percents.

Example 4. 5,6-Dichloro-2-difluoromethyl-1H-imidazo(4,5-b)pyrazine

Using the general method of Example 1.b, the pyrazine was reacted with difluoroacetic acid in xylene. 4.8 Grams of the titled product, with an M.P. of 173–4° C., resulted.

Carbon, hydrogen and nitrogen analysis indicated weight percents of 30.4, 1.0 and 23.0, respectively, as compared with theoretical values of 30.2, 0.8 and 23.4 weight percents.

Example 5. 5,6-Dibromo-2-trifluoromethyl-1H-imidazo(4,5-b)pyrazine

In order to prepare 2,3-diamino-5,6-dibromopyrazine, 25 g. (0.063 mole) of tetrabromopyrazine (see U.S. Pat. 3,471,496) was aminated in 200 ml. of concentrated $NH_4OH$ at 120° C. for 14 hours (see the previously cited article by Palamidessi and Luini). 7.2 Grams of the desired diamino compound resulted (M.P. 252° C.).

To 13.4 grams (0.05 mole) of this diamine, then, was added 100 ml. of xylene, and the mixture was then heated to boiling under reflux. To this mixture was slowly added 8 ml. of trifluoroacetic anhydride followed by 20 ml. of xylene. Heating was continued under reflux for 24 hours. The reaction mixture was evaporated to dryness under reduced pressure and the residue extracted with benzene followed by sublimation to give 12.7 g. of the desired product, M.P. 191–2° C.

Carbon, hydrogen and nitrogen analysis indicated weight percents of 21.3, 0.7 and 16.4, respectively, as compared with theoretical values of 20.8, 0.3 and 16.2 weight percents.

Example 6. 5,6-Difluoro-2-trifluoromethyl-1H-imidazo(4,5-b)pyrazine

In order to prepare 2,3-diamino-5,6-difluoropyrazine, 85 g. (0.39 mole) of tetrachloropyrazine was mixed with 454 g. of anhydrous KF and heated in a bomb for 15 hours at 315° C. The tetrafluoropyrazine so obtained was collected in traps filled with benzene and 2-propanol, the combined solution then being saturated with ammonia to produce aminotrifluoropyrazine. This was then further aminated with 300 g. of concentrated $NH_4OH$ to give 24.4 g. of the desired precursor.

7.3 Grams (0.05 mole) of the above pyrazine was then added to 120 ml. of xylene. To this mixture, at room temperature, was added 8 ml. of trifluoroacetic anhydride, the mixture being heated to boiling under reflux for 6 hours. There was recovered 6.7 g. of product with a melting point of 150–2° C.

Analysis gave carbon, hydrogen and nitrogen contents of 32.6, 0.5 and 24.6 weight percents, respectively, as compared to theoretical values of 32.2, 0.5 and 25.0 weight percents.

Other compounds which can be prepared by the above general methods include the following:

5,6-Difluoro-2-(pentafluoroethyl)-1H-imidazo(4,5-b)pyrazine 5,6-Dibromo-2-(n-heptafluoropropyl)-1H-imidazo-(4,5-b)pyrazine 5,6-Difluoro-2-difluoromethyl-1H-imidazo(4,5-b)pyrazine 5,6-Dibromo-2-1,2,2,2-tetrafluoromethyl-1H-imidazo-(4,5-b)pyrazine 5,6-Dichloro-2-(n-hexafluoropropyl)-1H-imidazo-(4,5-b)pyrazine 5,6-Difluoro-2-(n-hexafluoropropyl)-1H-imidazo(4,5-b)pyrazine.

In order to illustrate the superiority of the compounds of this invention in regard to their nearest known analog, i.e., 5,6-dichloro-2-methyl - 1H - imidazo(4,5-b)pyrazine, side-by-side comparisons were run to assess their respective activities as herbicides.

An appropriate number of square pots (2½" x 2½") were filled with #26 soil (85% sand, 10% silt and 5% clay), said soil having a pH of 7. Seeds of the various plant species were then sown at a depth of ½" to ¾". The pots were then placed in a greenhouse and top-watered as necessary.

After the plants had reached a height of about 1 to 2 inches, an appropriate number were treated with various concentrations (i.e., 4000, 2000, 1000, 500, 250, 125, 62.5, 31.25 and 0 p.p.m.) of each compound. The treated plants were then returned to the greenhouse and sub-irrigated daily. Also, they were given nutrients twice weekly. Two weeks after treatment, they were visually inspected for percent control.

The table below shows the results. A dash (—) indicates no control in the case of Column (1), i.e., lowest dosage rate at which control was noted; or, in the case of Column (2), it indicates no dosage rate at which at least 75% control was noted. In the case of Column (2), the lowest dosage rate indicated is that at which at least 75% was noted; i.e., no extrapolations were made.

| Number | Compound | Corn 1[2] | Corn 2[3] | Rice 1 | Rice 2 | Wheat 1 | Wheat 2 | Wild oats 1 | Wild oats 2 | Barnyard grass 1 | Barnyard grass 2 | Crabgrass 1 | Crabgrass 2 |
|---|---|---|---|---|---|---|---|---|---|---|---|---|---|
| 1 | 5,6-dichloro-2-methyl[1] | — | — | — | — | — | — | 2,000 | — | 1,000 | — | 2,000 | — |
| 2 | 5,6-dichloro-2-trifluoromethyl | 250 | 2,000 | 62.5 | 250 | 500 | 2,000 | 31.25 | 125 | 31.25 | 62.5 | 31.25 | 62.5 |
| 3 | 5,6-dichloro-2-pentafluoroethyl | 500 | 2,000 | 62.5 | 1,000 | 250 | 2,000 | 62.5 | 250 | 62.5 | 250 | 62.5 | 125 |
| 4 | 5,6-dichloro-2-heptafluoropropyl | 250 | 4,000 | 250 | 4,000 | 1,000 | 4,000 | 500 | 1,000 | 125 | 500 | 62.5 | 125 |
| 5 | 5,6-dichloro-2-difluoromethyl | 1,000 | 4,000 | 31.25 | 125 | 250 | 1,000 | 31.25 | 125 | 62.5 | 125 | 250 | 1,000 |
| 6 | 5,6-dibromo-2-trifluoromethyl | 500 | 4,000 | 125 | 2,000 | 1,000 | 4,000 | 125 | 500 | 31.25 | 125 | 62.5 | 250 |

| No. of Compound | Johnson grass 1 | Johnson grass 2 | Sorghum 1 | Sorghum 2 | German mullet 1 | German mullet 2 | Velvet leaf 1 | Velvet leaf 2 | Annual morning glory 1 | Annual morning glory 2 | Rape 1 | Rape 2 | Soybean 1 | Soybean 2 | Cotton 1 | Cotton 2 | Pigweed 1 | Pigweed 2 | Bindweed 1 | Bindweed 2 |
|---|---|---|---|---|---|---|---|---|---|---|---|---|---|---|---|---|---|---|---|---|
| 1[1] | — | — | — | — | 500 | 2,000 | 1,000 | — | 250 | — | 500 | — | — | — | 500 | — | 500 | 4,000 | — | — |
| 2 | 62.5 | 250 | 62.5 | 500 | 31.25 | 31.25 | 250 | 2,000 | 31.25 | 31.25 | 31.25 | 62.5 | 31.25 | 62.5 | 31.25 | 250 | 31.25 | 31.25 | 31.25 | 125 |
| 3 | 125 | 500 | 125 | 1,000 | 31.25 | 250 | 31.25 | 500 | 31.25 | 125 | 31.25 | 62.5 | 62.5 | 250 | 62.5 | 500 | 31.25 | 62.5 | 62.5 | 250 |
| 4 | 500 | 2,000 | 250 | 1,000 | 31.25 | 250 | 62.5 | 500 | 31.25 | 125 | 31.25 | 125 | 125 | 250 | 62.5 | 500 | 31.25 | 31.25 | 62.5 | 250 |
| 5 | 125 | 500 | 31.25 | 250 | 31.25 | 125 | 125 | 1,000 | 31.25 | 62.5 | 31.25 | 125 | 62.5 | 125 | 62.5 | 250 | — | 125 | 500 | 1,000 |
| 6 | 250 | 1,000 | 62.5 | 500 | 31.25 | 62.5 | 500 | 2,000 | 31.25 | 62.5 | 31.25 | 125 | 62.5 | 125 | 31.25 | 250 | 31.25 | 125 | 125 | 500 |

[1] Prior art compound.
[2] Lowest dosage at which control was observed.
[3] Lowest dosage at which at least 75% was observed.

The various analogs of the instant invention have also been found biologically useful as follows: 5,6-dichloro-2-pentafluoroethyl- and 5,6 - dibromo - 2 - difluoromethyl-, 100% control of houseflies at 500 p.p.m.; 5,6-dichloro-2-trifluoromethyl-, 5,6-dichloro-2-difluoromethyl- and 5,6-dibromo-2-trifluoromethyl-, 100% control of houseflies at 250 p.p.m.; 5,6-difluoro-2-trifluoromethyl, 100% control of round worms (human) at 300 p.p.m.; and 5,6-dibromo and difluoro-2-trifluoromethyl-, 100% control of wheat leaf rust fungus at 25 p.p.m. Also, the following analogs, at 100 to 500 p.p.m., gave 50 to 100% control of some common microorganism (e.g., *Bacillus subtilis, Staphylococcus aureus, Escherichia coli, Salmonella typhosa, Mycobacterium phlei* and *Trichophton mentagrophytes*): 5,6-dichlorodibromo and difluoro-2-trifluoromethyl; 5,6-dichloro and dibromo-2-difluoromethyl; and 5,6-dichloro-2-pentafluoroethyl.

Preferred species of the instant invention include 5,6-dichloro, dibromo or difluoro-2-trifluoromethyl-1H-imidazo(4,5-b) - pyrazine; 5,6 - dichloro-2-difluoromethyl-1H-imidazo(4,5-b)pyrazine; and 5,6-dichloro - 2 - pentafluoromethyl-1H-imidazo(4,5-b)pyrazine.

I claim:
1. Imidazopyrazines of the formula

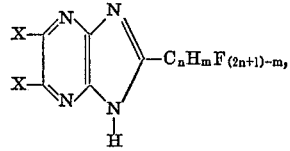

wherein X is Cl, Br or F, the same in each occurrence; $n$ is 1 to 3; and $m$ is 0 or 1.

2. The compound of Claim 1 wherein $n$ is 1 and $m$ is 0.

3. The compound of Claim 1 wherein X is Cl, $n$ is 1 and $m$ is 1.

4. The compound of Claim 1 wherein X is Cl, $n$ is 2 and $m$ is 0.

References Cited

Palamidessi et al.—C.A. *66*, 37886g (1967).

DONALD G. DAUS, Primary Examiner

R. V. RUSH, Assistant Examiner

U.S. Cl. X.R.
71—92; 260—999